(12) United States Patent
Huang et al.

(10) Patent No.: US 11,823,574 B2
(45) Date of Patent: Nov. 21, 2023

(54) METHOD AND APPARATUS FOR PREDICTION ROAD CONDITION, DEVICE AND COMPUTER STORAGE MEDIUM

(71) Applicant: BEIJING BAIDU NETCOM SCIENCE AND TECHNOLOGY CO., LTD., Beijing (CN)

(72) Inventors: Jizhou Huang, Beijing (CN); Hao Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 626 days.

(21) Appl. No.: 17/042,834

(22) PCT Filed: Mar. 28, 2019

(86) PCT No.: PCT/CN2019/080043
§ 371 (c)(1),
(2) Date: Sep. 28, 2020

(87) PCT Pub. No.: WO2020/191701
PCT Pub. Date: Oct. 1, 2020

(65) Prior Publication Data
US 2021/0241618 A1    Aug. 5, 2021

(51) Int. Cl.
*G08G 1/0968*    (2006.01)
*G01C 21/34*    (2006.01)
(Continued)

(52) U.S. Cl.
CPC ... *G08G 1/096844* (2013.01); *G01C 21/3492* (2013.01); *G01C 21/3641* (2013.01);
(Continued)

(58) Field of Classification Search
CPC .......... G08G 1/096844; G08G 1/0112; G08G 1/0129; G08G 1/0133; G08G 1/096708;
(Continued)

(56) References Cited

U.S. PATENT DOCUMENTS 6,317,686 B1 *  11/2001  Ran ...................... G08G 1/0141
                                                    73/178 R
10,698,421 B1 *  6/2020  Harris .................... H04W 4/42
(Continued)

FOREIGN PATENT DOCUMENTS

CN    104567897 A    4/2015
CN    104851298 A    6/2015
(Continued)

OTHER PUBLICATIONS

Notice of Reason for Refusal from JP app No. 2020-556771, dated Oct. 19, 2021, with English translation from Global Dossier, all pages.
(Continued)

*Primary Examiner* — Yazan A Soofi
(74) *Attorney, Agent, or Firm* — Ladas & Parry, LLP

(57) ABSTRACT

A method and apparatus for predicting a road condition, a device and a computer storage medium are disclosed. The method includes: determining at least two continuous road segments obtained by dividing a navigation path; and performing the following processing on each road segment one by one from the starting point of the navigation path to the end point thereof respectively: determining the moment when the user reaches the road segment processed currently; predicting road condition information of the road segment processed currently at the determined moment; and predicting passing duration of the user at the road segment processed currently based on the road condition information of the road segment processed currently at the determined (Continued)

moment. With such a road-condition prediction mode, the road condition at the moment when the user will reach each road segment in the future may be predicted, and compared with the mode of predicting the road condition based on the user query moment, more accurate road condition information may be provided.

15 Claims, 6 Drawing Sheets

(51) Int. Cl.
*G01C 21/36* (2006.01)
*G08G 1/01* (2006.01)
*G08G 1/0967* (2006.01)

(52) U.S. Cl.
CPC ......... *G08G 1/0112* (2013.01); *G08G 1/0129* (2013.01); *G08G 1/0133* (2013.01); *G08G 1/096708* (2013.01); *G08G 1/096775* (2013.01)

(58) Field of Classification Search
CPC .......... G08G 1/096775; G01C 21/3492; G01C 21/3641
USPC .......................................................... 701/414
See application file for complete search history.

(56) References Cited

U.S. PATENT DOCUMENTS

| | | | | |
|---|---|---|---|---|
| 10,948,927 B1* | 3/2021 | Harris | ....................... | G08G 1/22 |
| 2011/0231091 A1* | 9/2011 | Gourlay | ........... | G08G 1/096883 |
| | | | | 701/465 |
| 2014/0201121 A1* | 7/2014 | Jones | ....................... | G06N 5/02 |
| | | | | 706/46 |
| 2019/0033083 A1* | 1/2019 | Ashida | ................. | G01C 21/343 |
| 2020/0105133 A1* | 4/2020 | Xie | ........................ | G06N 5/01 |
| 2021/0241618 A1* | 8/2021 | Huang | ................. | G08G 1/0133 |
| 2022/0136474 A1* | 5/2022 | Ostrowski | ........... | G06F 18/2431 |
| | | | | 123/179.4 |
| 2023/0177795 A1* | 6/2023 | Klement | ................... | G06T 9/00 |
| | | | | 382/103 |

FOREIGN PATENT DOCUMENTS

| | | |
|---|---|---|
| CN | 105139656 A | 12/2015 |
| CN | 105910612 A | 8/2016 |
| CN | 107063278 A | 8/2017 |
| CN | 109211253 A | 1/2019 |
| EP | 2410294 A1 | 1/2012 |
| JP | 2013032949 A | 2/2013 |
| JP | 2013524221 A | 6/2013 |
| WO | 2017010143 A1 | 1/2017 |
| WO | 2017113706 A1 | 7/2017 |
| WO | 2017130428 A1 | 8/2017 |

OTHER PUBLICATIONS

Notification of Reasons for Refusal from KR app. No. 10-2020-7029830, dated Dec. 17, 2021, with English translation from Global Dossier, all pages.
Written Opinion of the International Searching Authority from PCT/CN2019/080043, dated Nov. 1, 2019, with English translation from WIPO, all pages.
International Preliminary Report on Patentability from PCT/CN2019/080043, dated Sep. 28, 2021, with English translation from WIPO, all pages.
Extended European Search Report from EP app. No. 19920910.7, dated May 19, 2021.
Decision for Grant for JP Application No. JP2020-556771 dated Jun. 14, 2020 and its English Translation provided by Google Translate.
Summons to Attend Oral Proceedings EP19920910.7 issued by the European Patent Office on Jul. 28, 2022.
Final Rejection for Korean Patent Application 10-2020-7029830, dated Jun. 23, 2022 and its English Translation provided by Google Translate.
International Search Report for international application No. PCT/CN2019/080043, dated Nov. 1, 2019 and it's English translation provided by Google Translate.
Written Opinion for international application No. PCT/CN2019/080043, dated Nov. 1, 2019 and it's English translation provided by Google Translate.

* cited by examiner

# METHOD AND APPARATUS FOR PREDICTION ROAD CONDITION, DEVICE AND COMPUTER STORAGE MEDIUM

CROSS-REFERENCE TO RELATED APPLICATION

The present application is the U.S. national phase of PCT Application PCT/CN20191080043 filed on Mar. 28, 2019, the disclosure of which is incorporated herein by reference in its entirety.

TECHNICAL FIELD

The present disclosure relates to the technical field of computer application, and particularly to a method and apparatus for predicting a road condition, a device and a computer storage medium.

BACKGROUND

This section is intended to provide a background or context for embodiments of the present disclosure which are recited in the claims. The description herein is not admitted to be prior art by inclusion in this section.

With an increase in urban population and urban vehicle traffic volume, the problem of road congestion in cities, particularly big cities, has become one of the most concerned focuses for driving travel. In super cities, such as Beijing, Shenzhen, or the like, road congestion in peak hours may increase the travel cost by more than 70%. For each driver, if road condition information in a future period of time may be predicted accurately, so as to assist the driver in selecting a travel moment and a travel route to avoid congestion, the travel efficiency may be improved greatly.

Existing navigation tools are all provided based on the road condition information at the current moment (i.e., a query moment of a user). However, a traveling process from the query moment tends to be long, and in the process, a road condition may change greatly due to frequent changes thereof caused by the high traveling speed of a vehicle. Therefore, the road condition information of each road segment in a navigation path provided by the existing navigation tool for the user is inaccurate, such that a predicted arrival time is also inaccurate and unable to assist the user in making a correct decision.

SUMMARY

In view of this, the present disclosure provides a method and apparatus for predicting a road condition, a device and a computer storage medium, so as to provide road condition information which is more accurate.

In a first aspect, the present disclosure provides a method for predicting a road condition, the method including:
  determining at least two continuous road segments obtained by dividing a navigation path; and
  performing the following processing on each road segment from one by one a starting point of the navigation path to an end point thereof respectively:
  determining the moment when a user reaches the road segment processed currently;
  predicting road condition information of the road segment processed currently at the determined moment; and
  predicting passing duration of the user at the road segment processed currently based on the road condition information of the road segment processed currently at the determined moment.

According to a preferred embodiment of the present disclosure, the determining the moment when a user reaches the road segment processed currently includes:
  for the road segment starting from the starting point of the navigation path, taking a departure moment of the user as the moment when the user reaches the road segment processed currently; and
  for other road segments, determining the moment when the user reaches the road segment processed currently with the moment when the user reaches the previous road segment and the predicted passing duration of the user at the previous road segment.

According to a preferred embodiment of the present disclosure, the predicting road condition information of the road segment processed currently at the determined moment includes:
  determining duration from the moment when the user reaches the road segment processed currently to the current moment; and
  inputting information of the road segment processed currently, the duration and external factor features into a pre-trained road condition model, so as to obtain the road condition information of the road segment processed currently at the determined moment.

According to a preferred embodiment of the present disclosure, the road condition model is pre-trained by:
  collecting historical traffic flow information of each road segment as training data; and
  performing the following processing on each road segment respectively:
  determining corresponding road condition information of the road segment at each historical time point according to the traffic flow information of the road segment at each historical time point; and
  taking the road segment from which the user traveling at the road segment at each historical time point comes respectively and road condition information of the road segment determined by backtracking from each historical time point by preset duration, as well as external factor features for backtracking from each historical time point by the preset duration as input of a classification model, and taking the corresponding road condition information of the road segment at each historical time point as output of the classification model, so as to train the classification model to obtain the road condition model.

According to a preferred embodiment of the present disclosure, predicting passing duration of the user at the road segment processed currently based on the road condition information of the road segment processed currently at the determined moment includes:
  determining general features of the road segment processed currently, which include the road condition information;
  extracting personalized driving features of the user passing through the road segment processed currently from a historical driving record of the user; and
  inputting the general features and the personalized driving features into a pre-trained regression model to obtain the passing duration of the user at the road segment processed currently.

According to a preferred embodiment of the present disclosure, the regression model is pre-trained by:
  taking the general features of different users at each road segment, the personalized driving features of the users passing through each road segment and the passing duration of the users passing through each road segment as training samples; and training the regression model with the general features of different users at each road segment and the personalized driving features of the users passing through each road segment as input and the passing duration of the users passing through each road segment as output.

According to a preferred embodiment of the present disclosure, the general features further include at least one of:

a road segment length, a road grade, the number of traffic lights, waiting duration of the traffic lights and external factor features.

According to a preferred embodiment of the present disclosure, the external factor features include at least one of:

a time feature, a week feature, a season feature and a weather feature.

According to a preferred embodiment of the present disclosure, the personalized driving features include at least one of:

the number of historical passing times of the user at the road segment processed currently, information of a vehicle of the user, and a variance between the historical driving speed of the user at the road segment processed currently and a public driving speed.

According to a preferred embodiment of the present disclosure, the method further includes:

determining the moment when the user reaches the end point of the navigation path; or determining expected passing duration of the user at the navigation path.

According to a preferred embodiment of the present disclosure, the method further includes:

mapping the predicted road condition information of each road segment and each moment, and dynamically displaying the mapping result at an interface.

According to a preferred embodiment of the present disclosure, the mapping the predicted road condition information of each road segment and each moment, and dynamically displaying the mapping result at an interface includes:

mapping the predicted road condition information of each road segment at a time axis, and dynamically displaying a vehicle position and the road condition information which change over time at the interface.

According to a preferred embodiment of the present disclosure, the method further includes:

acquiring dragging operation of the user at the time axis; and displaying the vehicle position and the road condition information which correspond to the position of the time axis reached by the dragging operation of the user at the interface.

In a second aspect, the present disclosure further provides an apparatus for predicting a road condition, the apparatus including:

a road-segment determining unit configured to determine at least two continuous road segments obtained by dividing a navigation path; and a prediction processing unit configured to perform the following processing on each road segment one by one from a starting point of the navigation path to an end point thereof respectively:

determining the moment when a user reaches the road segment processed currently;

predicting road condition information of the road segment processed currently at the determined moment; and predicting passing duration of the user at the road segment processed currently based on the road condition information of the road segment processed currently at the determined moment.

According to a preferred embodiment of the present disclosure, the prediction processing unit includes:

an arrival-moment determining subunit configured to: for the road segment starting from the starting point of the navigation path, take a departure moment of the user as the moment when the user reaches the road segment processed currently, and for other road segments, determine the moment when the user reaches the road segment processed currently with the moment when the user reaches the previous road segment and the predicted passing duration of the user at the previous road segment.

According to a preferred embodiment of the present disclosure, the prediction processing unit includes:

a road-condition predicting subunit configured to determine duration from the moment when the user reaches the road segment processed currently to the current moment, and input information of the road segment processed currently, the duration and external factor features into a pre-trained road condition model, so as to obtain the road condition information of the road segment processed currently at the determined moment.

According to a preferred embodiment of the present disclosure, the prediction processing unit further includes:

a first training subunit configured to pre-train the road condition model by:

collecting historical traffic flow information of each road segment as training data; and performing the following processing on each road segment respectively:

determining corresponding road condition information of the road segment at each historical time point according to the traffic flow information of the road segment at each historical time point; and taking the road segment from which the user traveling at the road segment at each historical time point comes respectively and road condition information of the road segment determined by backtracking from each historical time point by preset duration, as well as external factor features for backtracking from each historical time point by the preset duration as input of a classification model, and taking the corresponding road condition information of the road segment at each historical time point as output of the classification model, so as to train the classification model to obtain the road condition model.

According to a preferred embodiment of the present disclosure, the prediction processing unit includes:

a passing-duration predicting subunit configured to determine general features of the road segment processed currently, which include the road condition information, extract personalized driving features of the user passing through the road segment processed currently from a historical driving record of the user, and input the general features and the personalized driving features into a pre-trained regression model to obtain the passing duration of the user at the road segment processed currently.

According to a preferred embodiment of the present disclosure, the prediction processing unit further includes:

a second training subunit configured to pre-train the regression model by:

taking the general features of different users at each road segment, the personalized driving features of the users passing through each road segment and the passing duration of the users passing through each road segment as training samples; and training the regression model with the general features of different users at each road segment and the personalized driving features of the users passing through each road segment as input and the passing duration of the users passing through each road segment as output.

According to a preferred embodiment of the present disclosure, the apparatus further includes:

an end-point-moment determining unit configured to determine the moment when the user reaches the end point of the navigation path; or a passing-duration determining unit configured to determine expected passing duration of the user at the navigation path.

According to a preferred embodiment of the present disclosure, the apparatus further includes:

a dynamic display unit configured to map the predicted road condition information of each road segment and each moment, and dynamically display the mapping result at an interface.

In a third aspect, the present disclosure provides a device, the device including:

one or more processors; and a storage apparatus for storing one or more programs, wherein the one or more programs, when executed by the one or more processors, enable the one or more processors to implement the above-mentioned method.

In a fourth aspect, the present disclosure provides a storage medium containing computer executable instructions which, when executed by a computer processor, perform the above-mentioned method.

From the above technical solution according to the present disclosure, the moment when the user reaches each road segment is calculated one by one from the starting point of the navigation path, the road condition of the road segment at the moment is predicted, and the passing duration of the user at each road segment is determined based on the predicted road condition until the end point of the navigation path. With such a road-condition prediction mode, the road condition at the moment when the user will reach each road segment in the future may be predicted, and compared with the mode of predicting the road condition based on the user query moment, more accurate road condition information may be provided.

DETAILED DESCRIPTION OF EMBODIMENTS

The present disclosure will be described in detail with reference to figures and specific embodiments to make objectives, technical solutions and advantages of the present disclosure more apparent.

The present disclosure has the core concept that with a road segment as a unit, the moment when a user reaches each road segment is calculated one by one from a starting point of a navigation path, a road condition of the road segment at the moment is predicted, and passing duration of the user at each road segment is determined based on the predicted road condition until an end point of the navigation path. The present disclosure will be described below in detail in conjunction with embodiments.

Figure 1:
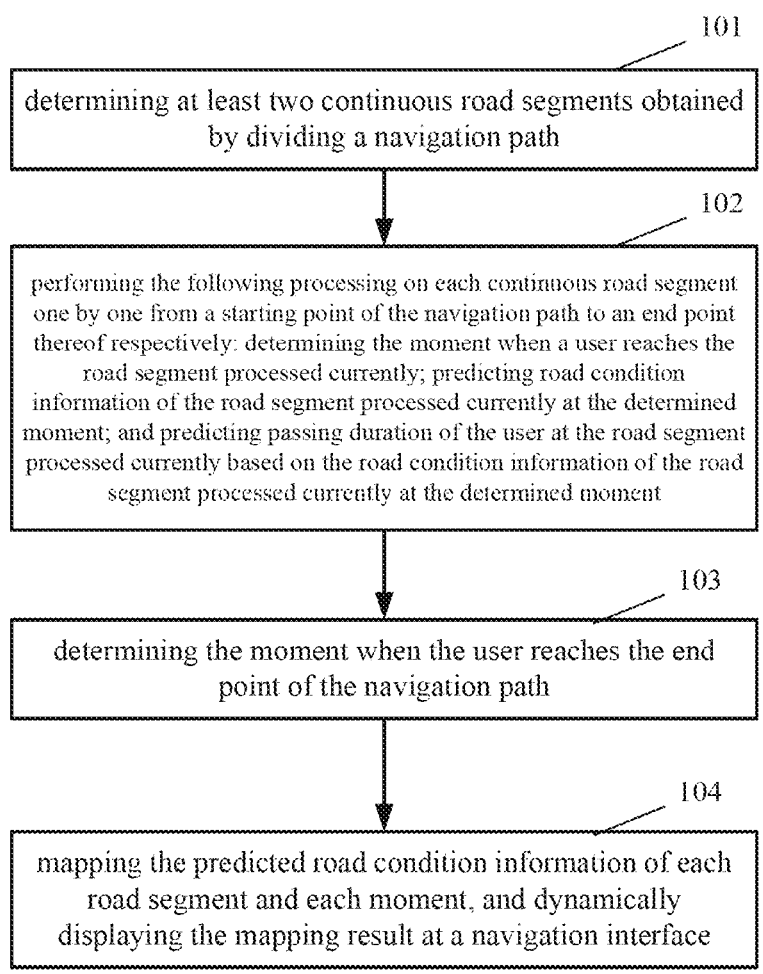
FIG. 1 is a flow chart of a main method according to an embodiment of the present disclosure.

FIG. 1 is a flow chart of a main method according to an embodiment of the present disclosure. As shown in FIG. 1, the method mainly includes the following steps:

101: determining at least two continuous road segments obtained by dividing a navigation path.

When a user inputs a starting point and an end point in a navigation application to query a navigation path, one or two or more navigation paths may be matched. The method according to the embodiment of the present disclosure may be performed on each matched navigation path or a plurality of selected navigation paths to predict the road condition respectively.

For example, after the user inputs the starting and end points, ten navigation paths are matched by the navigation application in a map database, and the method according to the embodiment of the present disclosure may be performed on the ten navigation paths to predict the road condition respectively. For another example, if three of the navigation paths have the shortest distances, the method according to the embodiment of the present disclosure may be performed on the three navigation paths to predict the road condition respectively. For another example, if the user selects one navigation path from the ten navigation paths, the method according to the embodiment of the present disclosure may be performed only on the navigation path selected by the user to predict the road condition. The present disclosure has no limitation in this regard.

In the embodiment of the present disclosure, one navigation path may be divided into at least two continuous road segments. The road segment refers to a road without an intersection and serves as the smallest constituent unit of a road network. Information of the continuous road segments obtained by dividing the navigation path may be acquired from a road network database, which is not limited in the present disclosure in which only the result of the division is required to be acquired and utilized.

102: performing the following processing on each continuous road segment one by one from the starting point of the navigation path to the end point thereof respectively: determining the moment when the user reaches the road segment processed currently; predicting road condition information of the road segment processed currently at the determined moment; and predicting passing duration of the user at the road segment processed currently based on the road condition information of the road segment processed currently at the determined moment.

Figure 2:
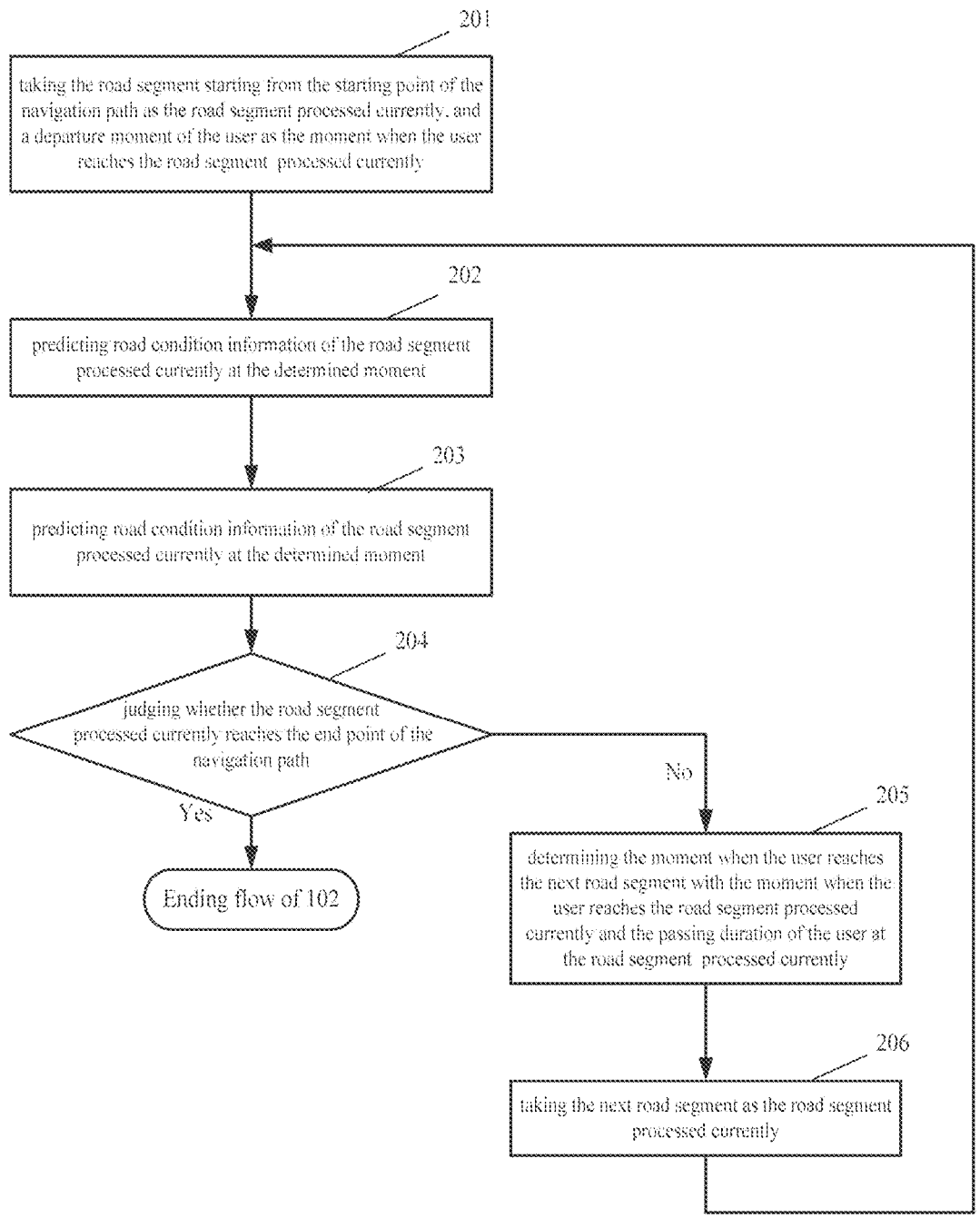
FIG. 2 is a flow chart of an implementation of step 102 in FIG. 1.

As shown in FIG. 2, the above-mentioned step 102 in an embodiment may specifically include the following steps:

201: taking the road segment starting from the starting point of the navigation path as the road segment processed currently, and a departure moment of the user as the moment when the user reaches the road segment processed currently.

202: predicting road condition information of the road segment processed currently at the determined moment.

The road condition may be understood as a congestion condition of the road segment, reflected as a congestion degree, and embodied in various forms, for example, a percentage, a congestion level, a class, such as clearness, slowness, congestion and severe congestion, or the like.

In this step, a road condition model implemented based on a classification model is used during prediction of the road condition information of the road segment. For convenience of understanding, a training process of the road condition model is described first.

First, historical traffic flow information of each road segment is collected as training data. A traffic flow condition of each road segment at each historical time point may be acquired from the historical traffic flow information of each road segment, thereby determining the road condition information of each road segment at each historical time point. A preset time unit, for example, minutes, may be adopted for each historical time point. The road segment of each vehicle identifier at each historical time point, i.e., vehicles located at each road segment at each historical time point, may also be acquired.

The following processing is performed on each road segment respectively:

determining corresponding road condition information of the road segment at each historical time point according to the traffic flow information of the road segment at each historical time point as output of the classification model; and backtracking from each historical time point by preset duration (for example, 1 minute, 2 minutes, 3 minutes, 4 minutes and 5 minutes), and extracting the road segment from which the user traveling at the road segment at each historical time point come respectively and road condition information of the road segment. For example, at the historical time point t, all users at the road segment L may only come from the road segments L1 and L2 five minutes ago, three users at the road segment L1 and five users at the road segment L2 five minutes ago, which is taken as a first input feature of the classification model.

External factor features for backtracking from each historical time point by the preset duration may also be extracted as a second input feature of the classification model, and may include, but are not limited to, a time feature, a week feature, a season feature and a weather feature.

The time feature may be continuously expressed with $$\sin\frac{2\pi(3600x+60y+z)}{86400} \text{ and } \cos\frac{2\pi(3600x+60y+z)}{86400},$$

for example, wherein x is hours, y is minutes, and z is seconds. For example, at 8:00:30 in the morning, x=8, y=0 and z=30, which are substituted into the formulas to calculate two values recorded together as the time feature.

The week feature may be continuously expressed with $$\sin\frac{2\pi m}{7} \text{ and } \cos\frac{2\pi m}{7},$$

for example, wherein m is weeks. For example, m corresponding to Monday is 0, m corresponding to Tuesday is 1, and so on.

The weather feature may be classified into categories, such as clear weather, overcast weather, light rain, heavy rain, light snow, heavy snow, bad weather, or the like, and expressed in a one-hot form. For example, the weather feature is represented as 1,0,0,0,0,0,0 in the clear weather and 0,1,0,0,0,0,0 in the overcast weather.

The season feature may be classified into four categories of spring, summer, autumn and winter, and expressed in a one-hot form as well. For example, the season feature is represented as 1,0,0,0 in spring and 0,1,0,0 in summer.

After the input features and the output are determined, the classification model is trained to obtain the road condition model which includes a module for extracting the above-mentioned features and the above-mentioned classification model. For example, a KNN (k-NearestNeighbor) classification algorithm, or the like, may be adopted in the classification model. The road condition information of the road segment may be obtained by the trained road condition model according to road segment identification and the backtracking time.

The above-mentioned model training process is offline. Prediction of the road condition of the road segment based on the above-mentioned trained road condition model is online.

When the road condition is predicted, duration from the moment when the user reaches the road segment processed currently to the current moment (that is, the duration corresponds to the backtracking time in the above model training process) is determined first, and then, information of the road segment processed currently, the duration and external factor features are input into the pre-trained road condition model, so as to obtain the road condition information of the road segment processed currently at the moment when the road segment processed currently is reached. For the principle of the processing process of the road condition model, reference is made to the description in the training process, and the principle is not repeated herein.

203: predicting passing duration of the user at the road segment processed currently based on the road condition information of the road segment processed currently at the determined moment.

Specifically, general features of the road segment processed currently may be determined first, and the general features may include the road condition information of the road segment (i.e., the road condition information predicted in step 202), and may further include, but are not limited to, a road segment length, a road grade, the number of traffic lights, waiting duration of the traffic lights and external factor features, for example. The external factor features may include at least one of a time feature, a week feature, a season feature, a weather feature, or the like.

The passing duration of the user at the road segment processed currently may be predicted based on the general features, which is relatively mature. However, in a preferred embodiment of the present disclosure, the passing duration may be predicted further in conjunction with personalized features of the user besides the general features of the road segment. Since the personalized features of the user are embodied obviously in the passing duration of the road segment, driving habits of different users may cause an effect difference more than 20% at the same road segment. Therefore, personalized driving features of the user passing through the road segment processed currently may be extracted from a historical driving record of the user.

The personalized driving features may include at least one of: the number of historical passing times of the user at the road segment processed currently, information of a vehicle of the user, and a variance between the historical driving speed of the user and a public driving speed at the road segment processed currently.

Then, the above-mentioned extracted general features and personalized driving features are input into a pre-trained regression model to obtain the passing duration of the user at the road segment processed currently.

The passing duration of the user at the road segment processed currently refers to predicted duration required by the user to pass through the road segment processed currently, i.e., duration of the user from a starting point to an end point of the road segment processed currently.

The training process of the above-mentioned regression model is described briefly below.

Firstly, the general features of different users at each road segment, the personalized driving features of the users passing through each road segment and the passing duration of the users passing through each road segment are taken as training samples; the regression model is trained with the general features of different users at each road segment and the personalized driving features of the users passing through each road segment as input and the passing duration of the users passing through each road segment as output.

The general features and the personalized driving features adopted when the regression model is trained have the same dimensions as those adopted when the passing duration is predicted utilizing the training model, and are not repeated herein.

204: judging whether the road segment processed currently reaches the end point of the navigation path, if so, ending the flow of step 102, otherwise, performing 205.

205: determining the moment when the user reaches the next road segment according to the moment when the user reaches the road segment processed currently and the passing duration of the user at the road segment processed currently.

206: taking the next road segment as the road segment processed currently, and proceeding to step 202.

Figure 3:
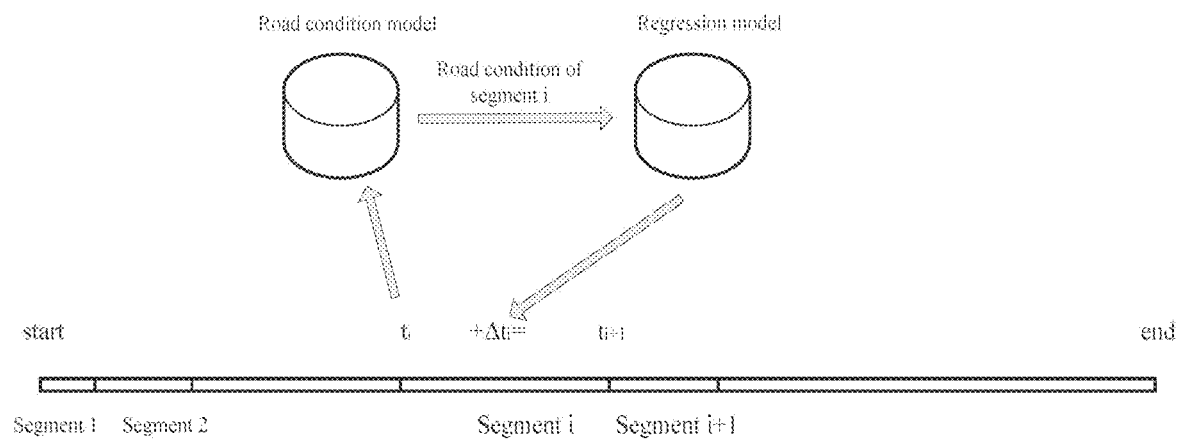
FIG. 3 is a schematic diagram of an implementation process according to an embodiment of the present disclosure.

The above-mentioned implementing flow may have the principle that the navigation path is divided into the road segments, and the flow shown in FIG. 2 is performed on each road segment from the starting point, as shown in FIG. 3. For the road segment i, duration from the moment $t_i$ when the user reaches the road segment i to the current moment is determined with $t_i$ as the backtracking time, and the road segment information, the backtracking time and the external factor features are input into the road condition model to obtain the road condition information of the road segment i. The general features containing the road condition information of the road segment i and the personalized features of the user at the road segment i are input into the regression model to obtain the passing duration $\Delta t_i$ of the user at the road segment i. The moment $t_{i+1}$ when the user reaches the next road segment i+1 is obtained using $t_i$ and $\Delta t_i$. The above-mentioned process is performed on each road segment sequentially until the end point.

Referring to FIG. 1, the following steps may be further performed:

103: determining the moment when the user reaches the end point of the navigation path.

This step may be performed by two manners:

The first manner: determining the moment when the user reaches the end point of the navigation path using a departure moment of the user and the predicted passing duration of each road segment.

The second manner determining the moment when the user reaches the end point of the navigation path using the determined moment when the user reaches the last road segment and the predicted passing duration of the user at the last road segment.

The moment when the end point of the navigation path is reached may be used for providing the user with an expected arrival time of the navigation path. For example, the user is provided with "the end point of the navigation path is expected to be reached at 10:26:00" at the navigation interface.

Besides 103, expected passing duration of the user at the whole navigation path may also be determined; that is, the passing duration of each road segment is accumulated and provided for the user. For example, the user is provided with "the navigation path is expected to take 22 minutes" at the navigation interface.

The above-mentioned predicted moment when the end point of the navigation path is reached or the expected passing duration of the user at the whole navigation path may be used for the system to select the navigation path to feed back the result to the user, and may also be used for being displayed at the navigation interface for the user to select the navigation path.

For example, after the expected passing duration of a plurality of navigation paths is calculated by the system, three navigation paths with the shortest expected passing duration may be selected from the navigation paths to be fed back to the user at the navigation interface. Further, the expected passing duration of the three navigation paths may also be displayed at the navigation interface, such that the user may select one from the three navigation paths as the navigation path which is adopted finally.

104: mapping the predicted road condition information of each road segment to each moment, and displaying dynamically the mapping result at the navigation interface. For the display of the predicted result of the road condition information at the navigation interface, a display mode in the prior art may be adopted; for example, the road condition information of each road segment in the navigation result is distinguished in different colors, which tends to be static.

However, in a more preferred embodiment, the road condition of each road segment may be displayed dynamically in the mode shown in 104. Specifically, the predicted road condition information of each road segment may be mapped onto a time axis, and a vehicle position and the road condition information which change over time may be displayed at the navigation interface dynamically.

Figure 4A:
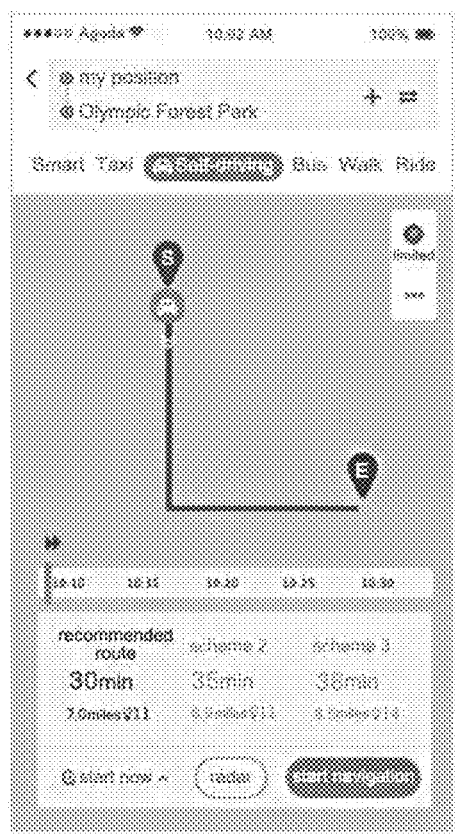
FIGS. 4a, 4b and 4c are example diagrams of dynamic display of a road condition according to an embodiment of the present disclosure.
Figure 4B:
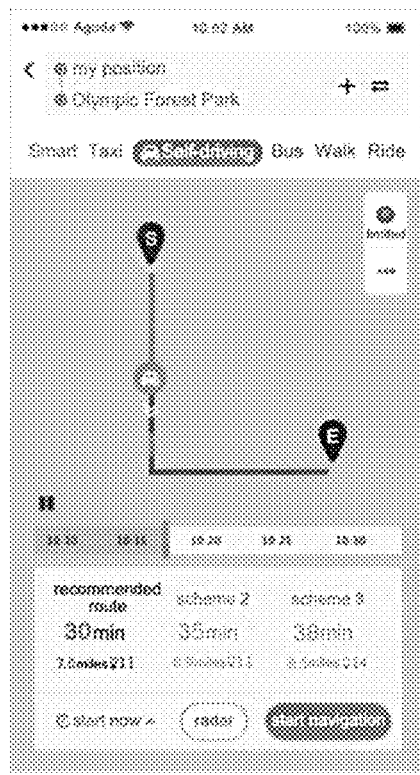
Figure 4C:
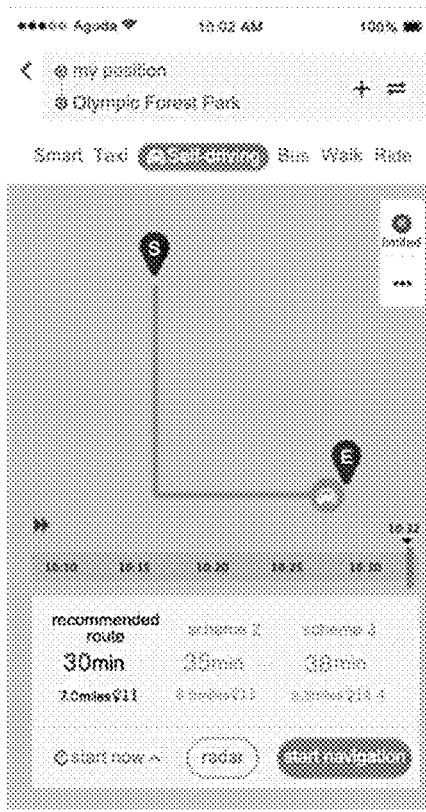

As shown in FIG. 4a, after the user inputs the starting and end points in the navigation application, and the above-mentioned method according to the embodiment of the present disclosure is performed on each matched navigation path respectively, the passing duration of each navigation path is obtained, and three navigation paths with the shortest passing duration may be selected as three schemes for the user to select. If the user selects one of the navigation paths, the predicted road condition information of each road segment of the navigation path is mapped at the time axis, and the vehicle position and the road condition information which change over time are displayed at the navigation interface dynamically. FIG. 4a is an exemplary diagram of the interface when a playing process is started, and when the playing process is started, the vehicle is located at the starting point, and a user travel time is indicated at the time axis (playing progress bar). FIG. 4b is an exemplary diagram of the interface in the playing process, and at the interface, the vehicle is located at the corresponding road segment over time, the road condition information of the road segment at the current moment is displayed in different colors, and the corresponding moment is also indicated at the time axis (playing progress bar). FIG. 4c is an exemplary diagram of the interface when the displaying process is ended, and at the interface, the vehicle is located at the end point, and the time when the user reaches the end point is indicated at the time axis (playing progress bar). The above-mentioned whole playing process may be executed according to a triggering action of the user, for example, after the user selects one of the navigation paths or clicks a playing button, a dynamic process with the length of 2-5 seconds is automatically played. A dynamic process with the length of 2-5 seconds may also be automatically played for the navigation path defaulted to be displayed.

Further, the user may also manually perform a dragging operation at the time axis (playing progress bar) to observe the vehicle position and the road condition at a specified moment. That is, once the dragging operation of the user at the time axis is acquired, the vehicle position and the road condition information which correspond to the position of the time axis reached by the dragging operation of the user is displayed at the interface.

The method according to the present disclosure is described in detail above, and an apparatus for predicting a road condition according to the embodiment of the present disclosure is described in detail below. The apparatus for predicting the road condition configured to execute the operation of the above-mentioned method embodiment. The apparatus may be located in an application of a local terminal, or configured as a functional unit, such as a plug-in or software development kit (SDK) located in the application of the local terminal, or the like, or located at a server side, which is not particularly limited in the embodiment of the present disclosure.

Figure 5:
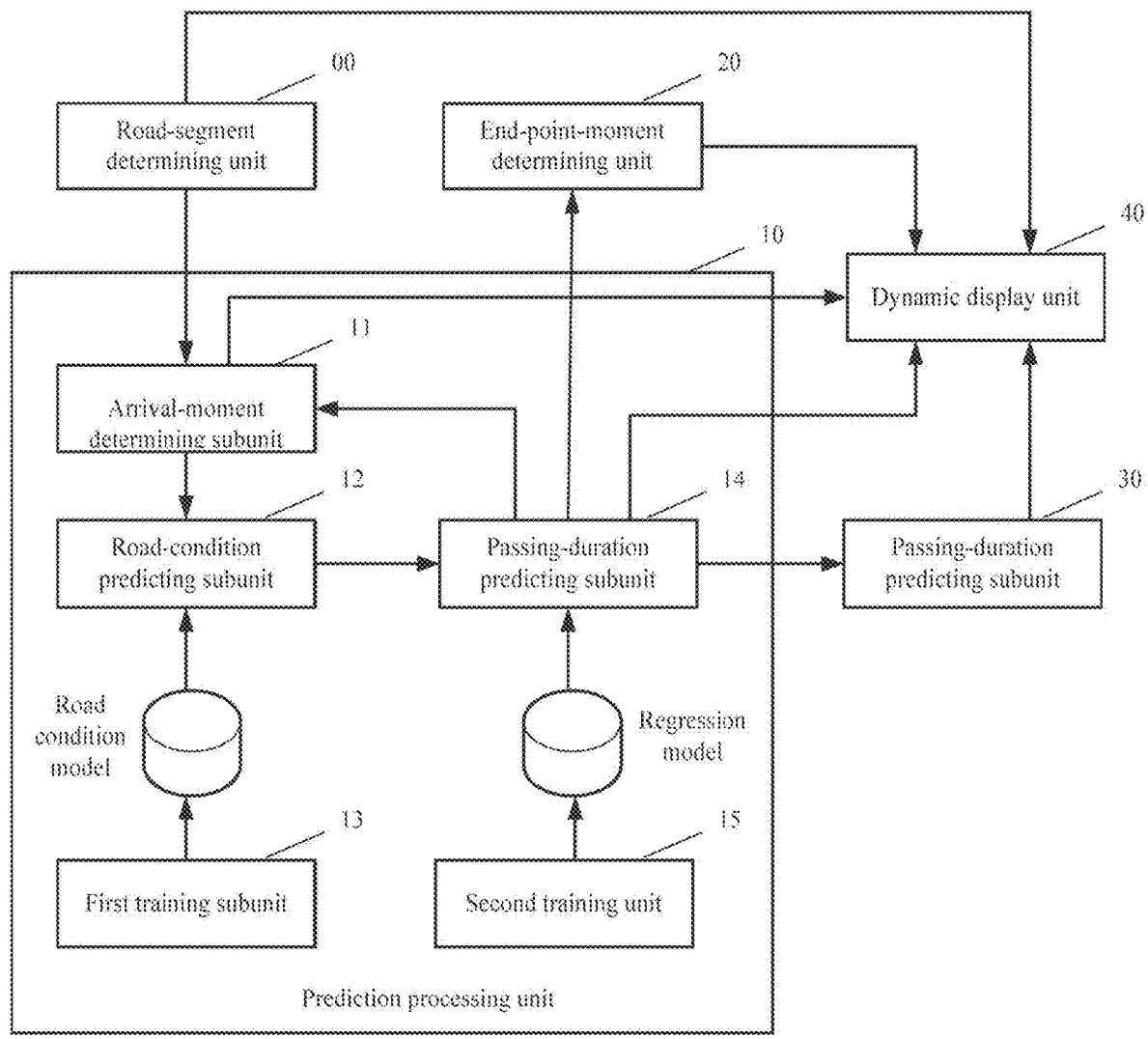
FIG. 5 is a structural diagram of an apparatus according to an embodiment of the present disclosure.

FIG. 5 is a structural diagram of an apparatus according to an embodiment of the present disclosure, and as shown in FIG. 5, the apparatus may include a road-segment determining unit 00 and a prediction processing unit 10, and may further include at least one of an end-point-moment determining unit 20, a passing-duration determining unit 30 and a dynamic displaying unit 40. FIG. 5 illustrates an example of including the above-mentioned units at the same time.

The road-segment determining unit 00 is responsible for determining at least two continuous road segments obtained by dividing a navigation path.

In the embodiment of the present disclosure, one navigation path may be divided into at least two continuous road segments. Information of the continuous road segments obtained by dividing the navigation path may be acquired from a road network database, which is not limited in the present disclosure in which the road-segment determining unit 00 is only required to acquire and utilize the result of the division.

The prediction processing unit 10 is responsible for performing the following processing on each continuous road segment one by one from the starting point of the navigation path to the end point thereof respectively: determining the moment when the user reaches the road segment processed currently; predicting road condition information of the road segment processed currently at the determined moment; and predicting passing duration of the user at the road segment processed currently based on the road condition information of the road segment processed currently at the determined moment.

Specifically, the prediction processing unit 10 may include an arrival-moment determining subunit 11, a road-condition predicting subunit 12, a first training subunit 13, a passing-duration predicting subunit 14 and a second training subunit 15.

The arrival-moment determining subunit 11 is responsible for determining the moment when the user reaches the road segment processed currently. Specifically, for the road segment starting from the starting point of the navigation path, a departure moment of the user may be taken as the moment when the user reaches the road segment processed currently, and for other road segments, the moment when the user reaches the road segment processed currently may be determined with the moment when the user reaches the previous road segment and the predicted passing duration of the user at the previous road segment.

The road-condition predicting subunit 12 is responsible for determining duration from the moment when the user reaches the road segment processed currently to the current moment, and input information of the road segment processed currently, the duration and external factor features into a pre-trained road condition model, so as to obtain the road condition information of the road segment processed currently at the determined moment.

The first training subunit 13 is responsible for pre-training the road condition model by:
collecting historical traffic flow information of each road segment as training data; and
performing the following processing on each road segment respectively:
determining corresponding road condition information of the road segment at each historical time point according to the traffic flow information of the road segment at each historical time point; and
taking the road segment from which the user traveling at the road segment at each historical time point comes respectively and road condition information of the road segment extracted by backtracking from each historical time point by preset duration, as well as external factor features for backtracking from each historical time point by the preset duration as input of a classification model, and taking the corresponding road condition information of the road segment at each historical time point as output of the classification model, so as to train the classification model to obtain the road condition model. The road condition model includes the module for extracting the above-mentioned features and the classification model.

The external factor features may include, but are not limited to, a time feature, a week feature, a season feature and a weather feature. For the expression of the various external factor features, reference is made in particular to the description in the method embodiment.

For example, a KNN (k-NearestNeighbor) classification algorithm, or the like, may be adopted in the classification model.

The passing-duration predicting subunit 14 is responsible for determining general features of the road segment processed currently, which include the road condition information, extracting personalized driving features of the user passing through the road segment processed currently from a historical driving record of the user, and inputting the general features and the personalized driving features into a pre-trained regression model to obtain the passing duration of the user at the road segment processed currently.

The second training subunit 15 is configured to pre-train the regression model by: taking the general features of different users at each road segment, the personalized driving features of the users passing through each road segment and the passing duration of the users passing through each road segment as training samples; and training the regression model with the general features of different users at each road segment and the personalized driving features of the users passing through each road segment as input and the passing duration of the users passing through each road segment as output.

The above-mentioned general features may include the road condition information of the road segment (i.e., the road condition information predicted by the road-condition predicting unit 12), and may further include, but are not limited to, a road segment length, a road grade, the number of traffic lights, waiting duration of the traffic lights and external factor features, for example. The external factor features may include at least one of a time feature, a week feature, a season feature, a weather feature, or the like.

The personalized driving features include at least one of: the number of historical passing times of the user at the road segment processed currently, information of a vehicle of the user, and a variance between the historical driving speed of the user at the road segment processed currently and a public driving speed.

The end-point-moment determining unit 20 is responsible for determining the moment when the user reaches the end point of the navigation path, which may be specifically performed by two manners:

The first manner: determining the moment when the user reaches the end point of the navigation path using a departure moment of the user and the predicted passing duration of each road segment.

The second manner determining the moment when the user reaches the end point of the navigation path using the determined moment when the user reaches the last road segment and the predicted passing duration of the user at the last road segment.

The passing-duration determining unit 30 is responsible for determining expected passing duration of the user at the navigation path. Specifically, expected passing duration of the user at the whole navigation path may be determined; that is, the passing duration of each road segment is accumulated and provided for the user.

The dynamic display unit 40 is responsible for mapping the predicted road condition information of each road segment and each moment, and dynamically displaying the mapping result at an interface. Specifically, the predicted road condition information of each road segment may be mapped at a time axis, and a vehicle position and the road condition information which change over time may be displayed at the navigation interface dynamically.

Further, the user may also manually perform a dragging operation at the time axis (playing progress bar) to observe the vehicle position and the road condition at a specified moment. That is, once the dragging operation of the user at the time axis is acquired, the dynamic display unit 40 displays the vehicle position and the road condition information which correspond to the position of the time axis reached by the dragging operation of the user at the interface.

In addition, some other designs may be combined with the display; for example, in the playing process, the predicted road condition of the road segment which the user is reaching or will reach is displayed in a different color, and the road condition of the road segment which the user has passed through is set to be gray.

Figure 6:
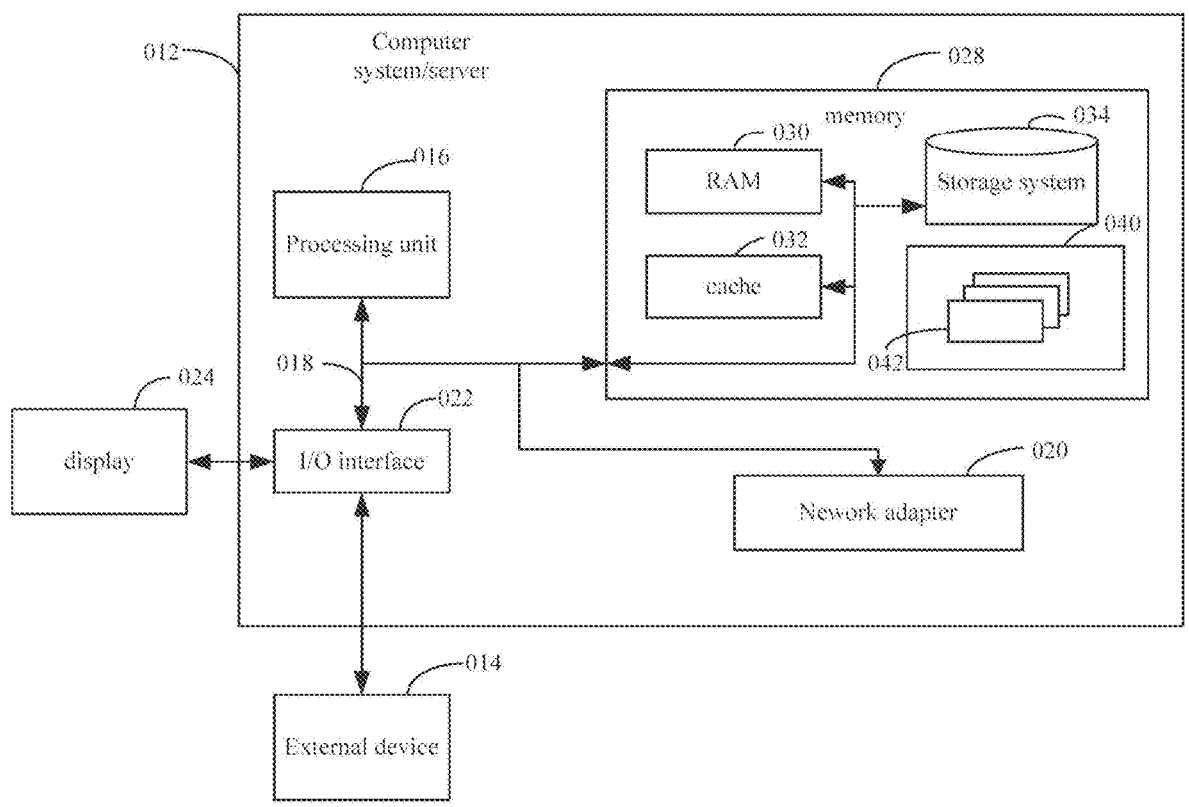
FIG. 6 shows a block diagram of an exemplary computer system/server suitable for implementing embodiments of the present disclosure.

FIG. 6 shows a block diagram of an exemplary computer system/server 012 suitable for implementing embodiments of the present disclosure. The computer system/server 012 shown in FIG. 6 is only an example and should not bring any limitations to the function and use range of the embodiment of the present disclosure.

As shown in FIG. 6, the computer system/server 012 is shown in the form of a general-purpose computing device. The components of the computer system/server 012 may include, but are not limited to, one or more processors or processing units 016, a system memory 028, and a bus 018 which connects various system components (including the system memory 028 and the processing units 016).

The bus 018 represents one or more of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 012 typically includes a variety of computer system readable media. Such media may be any available medium which is accessible by the computer system/server 012, and include both volatile and non-volatile media, removable and non-removable media.

The system memory 028 may include computer system readable media in the form of a volatile memory, such as a random access memory (RAM) 030 and/or a cache memory 032. The computer system/server 012 may further include other removable/non-removable, volatile/non-volatile computer system storage media. By way of example only, a storage system 034 may be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk (such as a CD-ROM, a DVD-ROM or other optical media) may be provided. In such instances, each drive may be connected with the bus 018 through one or more data media interfaces. The memory 028 may include at least one program product having a set (e.g., at least one) of program modules which are configured to carry out the functions of embodiments of the present disclosure.

A program/utility 040, having a set (at least one) of program modules 042, may be stored in the memory 028 by way of example, and not limitation, as well as an operating system, one or more application programs, other program modules, and program data. Each of these examples or a certain combination thereof might include an implementation of a networking environment. The program modules 042 generally carry out the functions and/or methodologies of embodiments of the present disclosure.

The computer system/server 012 may also communicate with one or more external devices 14a (such as a keyboard, a pointing device, a display 024, etc.); with an external radar device in the present disclosure; with one or more devices which enable the user to interact with the computer system/server 012; and/or with any device (e.g., a network card, a modem, etc.) which enables the computer system/server 012 to communicate with one or more other computing devices. Such communication may occur via Input/Output (I/O) interfaces 22*a*. Still yet, the computer system/server 012 may communicate with one or more networks (such as a local area network (LAN), a general wide area network (WAN), and/or a public network (e.g., the Internet)) via a network adapter 020. As shown, the network adapter 020 communicates with the other communication modules of the computer system/server 012 via the bus 018. It should be understood that although not shown in FIG. 6, other hardware and/or software modules may be used in conjunction with the computer system/server 012, and include, but are not limited to: microcodes, device drivers, redundant processing units, external disk drive arrays, RAID systems, tape drives, and data backup storage systems, etc.

The processing unit 016 executes various function applications and data processing by running programs stored in the system memory 028, for example, implements the method according to the embodiments of the present disclosure.

The above-mentioned computer program may be provided in a computer storage medium; that is, the computer storage medium is encoded with the computer program which, when executed by one or more computers, causes the one or more computers to perform the method and/or apparatus operations according to the above-mentioned embodiments of the present disclosure. For example, the method according to the embodiments of the present disclosure are executed by the above-mentioned one or more processors.

As time passes and technologies develop, the medium has a more and more extensive meaning, a propagation channel of the computer program is no longer limited to a tangible medium, and it may also be directly downloaded from the network. Any combination of one or more computer-readable media may be adopted. The computer-readable medium may be a computer-readable signal medium or a computer-readable storage medium. For example, the computer-readable storage medium may be, but not limited to, an electronic, magnetic, optical, electromagnetic, infrared, or semiconductor system, apparatus, or device, or any combination of the foregoing. More specific examples of the computer-readable storage medium include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the text herein, the computer-readable storage medium may be any tangible medium which contains or stores programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, an electromagnetic signal, an optical signal or any suitable combination thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to, radio, an electric wire, an optical cable, RF, or the like, or any suitable combination thereof.

Computer program codes for carrying out operations according to the present disclosure may be written in one or more programming languages or any combination thereof. The programming languages include an object oriented programming language, such as Java, Smalltalk, C++, or the like, and conventional procedural programming languages, such as the "C" programming language or similar programming languages. The program code may be executed entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

From the foregoing description, the method and apparatus, the device as well as the computer storage medium mentioned above according to the embodiments of the present disclosure may have the following advantages.

1) In the present disclosure, the moment when the user reaches each road segment is calculated one by one from the starting point of the navigation path, the road condition of the road segment at the moment is predicted, and the passing duration of the user at each road segment is determined based on the predicted road condition until the end point of the navigation path. With such a road-condition prediction mode, the road condition at the moment when the user will reach each road segment in the future may be predicted, and compared with the mode of predicting the road condition based on the user query moment, more accurate road condition information may be provided.

2) Based on the road condition information obtained in the above-mentioned prediction mode, the end-point arrival time of the navigation path and the passing duration thereof may be determined more accurately, so as to assist the user in making a correct decision.

3) In the present disclosure, a changing situation of the road condition in a future period of time may be accurately predicted according to a road condition rule which is learned historically in the road condition prediction mode provided for each road segment.

4) In the present disclosure, when the passing duration is predicted for each road segment, driving behaviors and habits of the user are taken into consideration, and the personalized driving features of the user are blended into the prediction of the passing duration, thereby providing a prediction result which is more accurate for the user.

5) In the present disclosure, the driving position of the vehicle at the navigation path and the road condition are displayed in conjunction with the time axis and played dynamically, and the user may also manually drag the progress bar to observe the vehicle position and the road condition at each moment.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for predicting a road condition, comprising:
determining at least two continuous road segments obtained by dividing a navigation path; and
performing the following processing on each road segment one by one from a starting point of the navigation path to an end point of the navigation path respectively:
determining the moment when a user reaches the road segment processed currently, comprising:
for the road segment starting from the starting point of the navigation path, taking a departure moment of the user as the moment when the user reaches the road segment processed currently; and
for other road segments, determining the moment when the user reaches the road segment processed currently according to the moment when the user reaches the previous road segment and the predicted passing duration of the user at the previous road segment;
predicting road condition information of the road segment processed currently at the determined moment, comprising:
determining duration from the moment when the user reaches the road segment processed currently to the current moment; and
inputting information of the road segment processed currently, the duration and external factor features into a pre-trained road condition model, to obtain the road condition information of the road segment processed currently at the determined moment; and
predicting passing duration of the user at the road segment processed currently based on the road condition information of the road segment processed currently at the determined moment,
wherein the road condition model is pre-trained by:
collecting historical traffic flow information of each road segment as training data; and
performing the following processing on each road segment respectively:
determining corresponding road condition information of the road segment at each historical time point according to the traffic flow information of the road segment at each historical time point; and
taking the road segment from which the user traveling at the road segment at each historical time point comes respectively, and road condition information of the road segment determined by backtracking from each historical time point by preset duration, as well as external factor features for backtracking from each historical time point by the preset duration, as input of a classification model, and taking the corresponding road condition information of the road segment at each historical time point as output of the classification model, to train the classification model to obtain the road condition model.

2. The method according to claim 1, wherein the predicting passing duration of the user at the road segment processed currently based on the road condition information of the road segment processed currently at the determined moment comprises:
determining general features of the road segment processed currently, wherein the general features comprise the road condition information;
extracting personalized driving features of the user passing through the road segment processed currently from a historical driving record of the user; and
inputting the general features and the personalized driving features into a pre-trained regression model to obtain the passing duration of the user at the road segment processed currently.

3. The method according to claim 2, wherein the regression model is pre-trained by:
taking the general features of different users at each road segment, the personalized driving features of the users passing through each road segment and the passing duration of the users passing through each road segment as training samples; and
training the regression model with the general features of different users at each road segment and the personalized driving features of the users passing through each road segment as input and the passing duration of the users passing through each road segment as output.

4. The method according to claim 3, wherein the general features further comprise at least one of:
a road segment length, a road grade, the number of traffic lights, waiting duration of the traffic lights or external factor features.

5. The method according to claim 1, wherein the external factor features comprise at least one of:
a time feature, a week feature, a season feature or a weather feature.

6. The method according to claim 2, wherein the personalized driving features comprise at least one of:
the number of historical passing times of the user at the road segment processed currently, information of a vehicle of the user, and a variance between the historical driving speed of the user and a public driving speed at the road segment processed currently.

7. The method according to claim 1, further comprising:
determining the moment when the user reaches the end point of the navigation path; or
determining expected passing duration of the user at the navigation path.

8. The method according to claim 1, further comprising:
mapping the predicted road condition information of each road segment to each moment, and displaying dynamically the mapping result at an interface.

9. The method according to claim 8, wherein the mapping the predicted road condition information of each road segment to each moment, and displaying dynamically the mapping result at an interface comprises:
mapping the predicted road condition information of each road segment onto a time axis, and displaying dynamically a vehicle position and the road condition information which change over time at the interface.

10. The method according to claim 9, further comprising:
acquiring dragging operation of the user at the time axis; and
displaying the vehicle position and the road condition information which correspond to the position of the time axis reached by the dragging operation of the user at the interface.

11. A device, comprising:
one or more processors; and
a storage apparatus for storing one or more programs,
wherein the one or more programs, when executed by the one or more processors, enable the one or more processors to implement a method for predicting a road condition which comprises:
determining at least two continuous road segments obtained by dividing a navigation path; and performing the following processing on each road segment one by one from a starting point of the navigation path to an end point of the navigation path respectively:

determining the moment when a user reaches the road segment processed currently, comprising:

for the road segment starting from the starting point of the navigation path, taking a departure moment of the user as the moment when the user reaches the road segment processed currently; and for other road segments, determining the moment when the user reaches the road segment processed currently according to the moment when the user reaches the previous road segment and the predicted passing duration of the user at the previous road segment;

predicting road condition information of the road segment processed currently at the determined moment, comprising:

determining duration from the moment when the user reaches the road segment processed currently to the current moment; and inputting information of the road segment processed currently, the duration and external factor features into a pre-trained road condition model, to obtain the road condition information of the road segment processed currently at the determined moment; and predicting passing duration of the user at the road segment processed currently based on the road condition information of the road segment processed currently at the determined moment, wherein the road condition model is pre-trained by:

collecting historical traffic flow information of each road segment as training data; and performing the following processing on each road segment respectively:

determining corresponding road condition information of the road segment at each historical time point according to the traffic flow information of the road segment at each historical time point; and taking the road segment from which the user traveling at the road segment at each historical time point comes respectively, and road condition information of the road segment determined by backtracking from each historical time point by preset duration, as well as external factor features for backtracking from each historical time point by the preset duration, as input of a classification model, and taking the corresponding road condition information of the road segment at each historical time point as output of the classification model, to train the classification model to obtain the road condition model.

12. A non-transitory storage medium containing computer executable instructions which, when executed by a computer processor, perform a method for predicting a road condition which comprises:

determining at least two continuous road segments obtained by dividing a navigation path; and performing the following processing on each road segment one by one from a starting point of the navigation path to an end point of the navigation path respectively:

determining the moment when a user reaches the road segment processed currently, comprising:

for the road segment starting from the starting point of the navigation path, taking a departure moment of the user as the moment when the user reaches the road segment processed currently; and for other road segments, determining the moment when the user reaches the road segment processed currently according to the moment when the user reaches the previous road segment and the predicted passing duration of the user at the previous road segment;

predicting road condition information of the road segment processed currently at the determined moment, comprising:

determining duration from the moment when the user reaches the road segment processed currently to the current moment; and inputting information of the road segment processed currently, the duration and external factor features into a pre-trained road condition model, to obtain the road condition information of the road segment processed currently at the determined moment; and predicting passing duration of the user at the road segment processed currently based on the road condition information of the road segment processed currently at the determined moment, wherein the road condition model is pre-trained by:

collecting historical traffic flow information of each road segment as training data; and performing the following processing on each road segment respectively:

determining corresponding road condition information of the road segment at each historical time point according to the traffic flow information of the road segment at each historical time point; and taking the road segment from which the user traveling at the road segment at each historical time point comes respectively, and road condition information of the road segment determined by backtracking from each historical time point by preset duration, as well as external factor features for backtracking from each historical time point by the preset duration, as input of a classification model, and taking the corresponding road condition information of the road segment at each historical time point as output of the classification model, to train the classification model to obtain the road condition model.

13. The device according to claim 11, wherein the predicting passing duration of the user at the road segment processed currently based on the road condition information of the road segment processed currently at the determined moment comprises:

determining general features of the road segment processed currently, wherein the general features comprise the road condition information;

extracting personalized driving features of the user passing through the road segment processed currently from a historical driving record of the user; and inputting the general features and the personalized driving features into a pre-trained regression model to obtain the passing duration of the user at the road segment processed currently.

14. The device according to claim 11, wherein the method further comprises:

determining the moment when the user reaches the end point of the navigation path; or determining expected passing duration of the user at the navigation path.

15. The device according to claim 11, wherein the method further comprises:

mapping the predicted road condition information of each road segment to each moment, and displaying dynamically the mapping result at an interface.

\* \* \* \* \*